Jan. 9, 1951        E. T. STEPPAN        2,537,606

HEATING MEANS FOR STEERING WHEELS

Filed Oct. 26, 1948        2 Sheets-Sheet 1

INVENTOR
Erwin Thomas Steppan
by Edward N. Fetherstonhaugh
ATTORNEY

Jan. 9, 1951            E. T. STEPPAN            2,537,606
HEATING MEANS FOR STEERING WHEELS
Filed Oct. 26, 1948            2 Sheets-Sheet 2
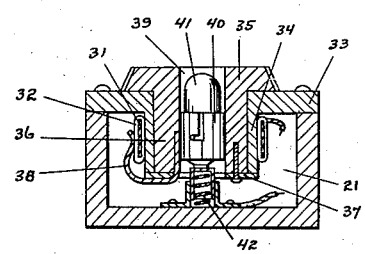
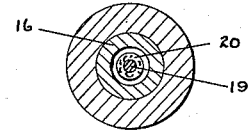
FIG-4        FIG-5
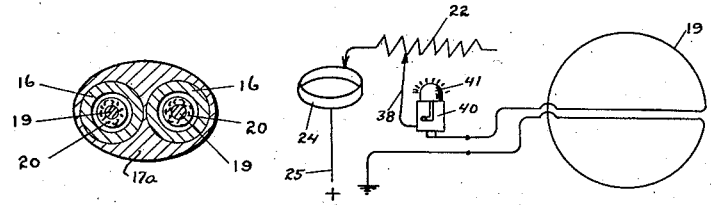
FIG-6        FIG-7
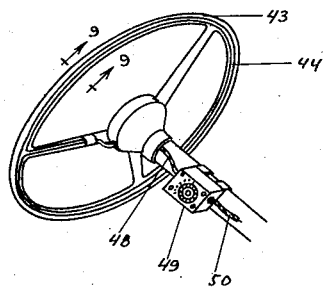
FIG-8
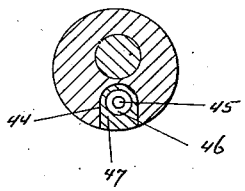
FIG-9
INVENTOR
Erwin Thomas Steppan
by Edward N. Fetherstonhaugh
ATTORNEY Patented Jan. 9, 1951

2,537,606

UNITED STATES PATENT OFFICE 2,537,606

HEATING MEANS FOR STEERING WHEELS

Erwin Thomas Steppan, Outremont, Quebec, Canada

Application October 26, 1948, Serial No. 56,558

1 Claim. (Cl. 219—19)

The invention relates to improvements in a heating means for steering wheels as described in the present specification and illustrated in the accompanying drawings that form a part of the same.

The invention consists essentially of the novel features of construction as pointed out broadly and specifically in the claim for novelty following a description containing an explanation in detail of acceptable forms of the invention.

Th objects of the invention are to devise heating means which will be adaptable for warming the steering wheel of automobiles, trucks, boats, aircraft and various other vehicles; to furnish a heating means for steering wheels which may be accommodated within the same and which will be provided with suitable heat regulation means; to construct a heating means for vehicles which may be inserted in the wheel during the manufacture of same, or which may be mounted within a portion of the wheel on existing vehicles; and generally to provide a heating means for steering wheels which will be safe, dependable, and efficient for its purpose.

In the drawings:

Figure 4 is an enlarged sectional view of the indicator and controller for the heating means as taken on the lines 4—4 in Figure 2.

Figure 5 is an enlarged cross sectional view of a portion of the steering wheel as taken on the line 5—5 in Figure 2.

Figure 6 is an enlarged sectional view as taken on the line 6—6 in Figure 2.

Figure 7 is a diagrammatic view showing the wiring diagram for the aforementioned heating means.

Figure 8 is a fragmentary perspective view showing a modified form of the heating means in the steering wheel in which the same may be assembled in existing steering wheels by slightly hollowing the same.

Figure 9 is an enlarged cross sectional view as taken on the line 9—9 in Figure 8.

Like numerals of reference indicate corresponding parts in the various figures.

Figure 1:
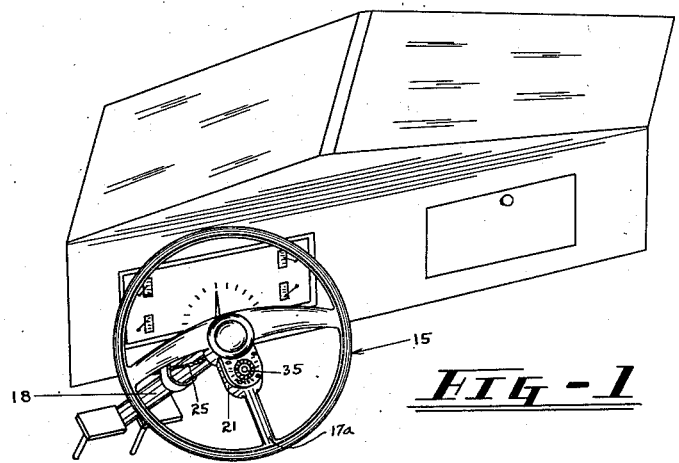
Figure 1 is a fragmentary perspective view showing the steering wheel located behind the dashboard of an automobile and having the heating means incorporated within the wheel.
Figure 2:
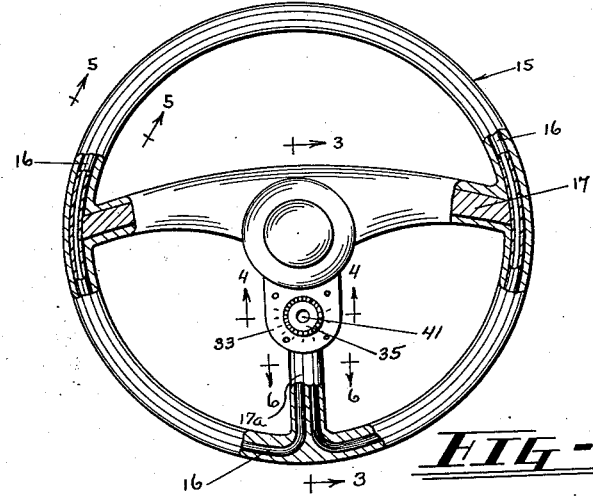
Figure 2 is an enlarged plan view of the steering wheel showing portions thereof broken away to illustrate the heating means within the same.
Figure 3:
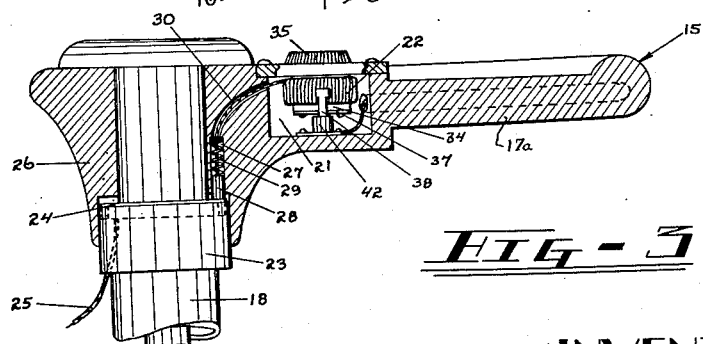
Figure 3 is a sectional view through the steering wheel as taken on the line 3—3 in Figure 2.

Referring to the drawings the heating means illustrated in Figures 1 to 7 inclusive is adapted to be assembled in the wheel during the manufacture thereof. The steering wheel as indicated by the numeral 15 consists of an element housing ring 16 which is of tubular formation and supported by the cross member 17 and both of the latter are then encased in a conventional molded material to complete the steering wheel. The free ends of this element housing ring 16 returning inward through a spoke 17A which extends inward from the wheel 15. These free ends of the housing ring then lead toward the support post 18 on which the steering wheel is mounted. The heating element 19 is suitably wrapped in the asbestos 20 and both of the same are accommodated within the element houisng ring 16. The free ends of this heating element 19 extend into the controller compartment 21 and one of the same is suitably connected to a rheostat 22 while the other goes direct to ground.

The rheostat 22 is suitably connected with an electrical power source. In this respect, an insulating ring 23 is fixedly secured on the support post 18, and a conducting ring 24 is inset in the upper portion thereof. This conducting ring 24 is suitably connected to an electrical power source by means of the conductor 25. The hub 26 of the steering wheel 15 extends downward partially over the insulating ring 23 and has a brush compartment 27 extending downward to the upper edge of the conducting ring 24. A brush or contact member 28 is slidably accommodated within the brush compartment 27 and a compression spring 29 located above the same exerts downward pressure thereon, thus making a constant contact with the conducting ring 24. A conductor 30 connects this brush 28 and the rheostat 22.

The rheostat 22 consists of a core 31 having a winding 32 thereon. The cover 33 of the controller compartment 21 is fixedly secured in position and has a cylindrical flange 34 extending downward therefrom. The rheostat 22 is suitably supported on the outer surface of this cylindrical flange. The indicating knob 35 rests on the cover 33 and has a cylindrically flanged portion 36 extending downward within the cylindrical flange 34 of the same. A ring 37 is fixedly secured on the lower edge of the cylindrically flanged portion 36 of the indicating knob 35. A contact strip 38 is supported on the underside of the ring 37 and extends upward to contact the outer surface of the winding 32 of the rheostat 22; while the inner end of this contact strip extends upward within an aperture 39 in the indicating knob 35 to make a contact with the indicating light socket 40. The indicating light 41 is suitably supported by the indicating light socket 40 and the lower end of same is contacted by a spring 42 which in turn is suitably connected to one of the free ends of the heating element 19.

The wiring diagram in Figure 7 shows the conducting ring 24 connected to an electrical power source by means of the conductor 25 and the rheostat 22 connected to the conducting ring by means of the conductor 30. The indicating light is shown connected to the rheostat 22 by means of the contact strip 38 and this light in turn, is shown connected to one of the free ends of the heating element 19; while the other free end of this heating element goes to ground.

In the operation of the invention the indicating knob 35 which has graduations marked thereon may be suitably turned with respect to the graduations shown on the upper surface of the cover 33 so as to produce the desired heat within the steering wheel 15. The indicating light 41 which is connected in the electric circuit for the heating element 19 serves to indicate when the heating means is in operation. It will be seen that a means has been set forth in which the steering wheel may be heated to any suitable degree and at the same time shut off when its use is not required.

The modification shown in Figures 8 and 9 is adapted to be operated in a similar manner to that of the foregoing with the exception that this type is adapted to be installed in existing steering wheels. In this respect, the steering wheel 43 has an annular groove 44 cut in the underside of same and extends completely around the steering wheel. In this instance the heating element 45 is suitably wrapped in asbestos 46 and the same is accommodated in the annular groove 44 in the steering wheel. A filler 47 is then placed around the heating element and asbestos 45 and 46 so as to completely fill the annular groove 44. The heating element 45 is connected to ground by means of the conductor 48 and also connected to a rheostat within the controller box 49. A conductor 50 leading from this controller box 44 is adapted to be secured to an electrical power source. The operation of this heating element 45 within the steering wheel 43 is accomplished in a similar way to that of the heating element 19 within the steering wheel 15.

It will be seen from the foregoing that heating means for steering wheels has been provided which will add comfort and safety for operators of vehicles, boats, aircraft and the like during low temperatures.

What I claim is:

In heating means for steering wheels, a steering wheel having a rim, a hub-like support post and spokes extending therebetween, a substantially continuous tubular ring encased in said steering wheel, said tubular ring having the free ends thereof returning inward through a spoke of said steering wheel and terminating in the vicinity of the support post for said steering wheel, a substantially continuous heating means accommodated within said tubular ring and having its free ends suitably connected to a source of energy in the vicinity of the support post for said steering wheel, a diagonal spokes-forming cross member mounted on the support post for said steering wheel, said cross member being fixedly secured at each end thereof to said tubular ring thereby supporting the same, and said tubular ring then forming a support for the rim of said steering wheel, said tubular ring and said cross member having a relatively high tensile strength, and said steering wheel being formed of a hardened substance molded around said tubular ring and said cross member.

ERWIN THOMAS STEPPAN.

REFERENCES CITED

The following references are of record in the file of this patent:

UNITED STATES PATENTS

| Number | Name | Date |
| --- | --- | --- |
| 1,751,365 | Schaaf | Mar. 18, 1930 |
| 2,163,450 | Preble | June 20, 1939 |

FOREIGN PATENTS

| Number | Country | Date |
| --- | --- | --- |
| 447,619 | Great Britain | May 22, 1936 |